United States Patent [19]
Starzewski et al.

[11] Patent Number: 4,769,422
[45] Date of Patent: Sep. 6, 1988

[54] POLYMER PRODUCTS CONTAINING POLYACETYLENE AND PROCESS FOR THE POLYMERISATION OF ACETYLENE IN THE PRESENCE OF POLYMERS

[75] Inventors: K. H. Aleksander O. Starzewski, Bad Vilbel; Josef Witte, Cologne, both of Fed. Rep. of Germany

[73] Assignee: Bayer Aktiengesellschaft, Leverkusen, Fed. Rep. of Germany

[21] Appl. No.: 881,880

[22] Filed: Jul. 3, 1986

[30] Foreign Application Priority Data

Jul. 23, 1985 [DE] Fed. Rep. of Germany ....... 3526234

[51] Int. Cl.$^4$ .................... C08L 1/08; C08L 19/00
[52] U.S. Cl. ........................... 525/245; 524/31; 524/32; 525/202; 525/275; 525/468; 527/313
[58] Field of Search ............. 525/202, 275, 245, 468; 524/31, 32; 527/313

[56] References Cited

U.S. PATENT DOCUMENTS

| | | | |
|---|---|---|---|
| 3,211,714 | 10/1965 | Hoffman | 525/202 |
| 4,394,304 | 7/1983 | Wnek . | |
| 4,454,178 | 6/1984 | Noarmann et al. | 427/302 |
| 4,481,312 | 11/1984 | Hocker et al. | 525/202 |
| 4,537,982 | 8/1985 | Starzewski et al. . | |
| 4,616,067 | 10/1986 | Lee et al. | 525/202 |
| 4,620,021 | 10/1986 | Starzewski et al. . | |

Primary Examiner—Allan M. Lieberman
Attorney, Agent, or Firm—Sprung Horn Kramer & Woods

[57] ABSTRACT

The polymerization of acetylene in the presence of polymers using certain nickel catalysts results in polyacetylene-containing polymer products which are readily processed while retaining their electrical properties.

5 Claims, No Drawings

POLYMER PRODUCTS CONTAINING POLYACETYLENE AND PROCESS FOR THE POLYMERISATION OF ACETYLENE IN THE PRESENCE OF POLYMERS

This invention relates to new polymer products containing polyacetylene and to their preparation by the polymerisation of acetylene in the presence of another polymer.

Polyacetylene is a suitable raw material for the manufacture of electric conductors and semi-conductors on an organic basis. A survey and literature references are given in the article "Polymere mit metallähnlicher Leitfähigkeit-Ein Überblick über Synthese, Struktur und Eigenschaften" by Gerhard Wegner, Angew. Chem. 93, 352 to 371 (1981), in particularly pages 354 to 359.

Pure polyacetylene has, however, serious disadvantages since it is unstable in air and difficult to process. Since it is insoluble and not fusible, it cannot be used, for example, for the manufacture of threads or films by extrusion.

It has now been found that polymer products containing polyacetylene which do not have the above mentioned disadvantages and yet have the required electric conductivity may be produced by polymerising acetylene in the presence of other polymers with the aid of suitable catalysts.

In this process, the polyacetylene may be produced in a polymer solution, in or on a swelled polymer or on a polymer surface.

Acetylene is preferably polymerised in a polymer solution. Any soluble polymers may be used for this purpose, e.g. polystyrene, polycarbonate, polyvinyl chloride, polychloroprene, polyether, polyacrylonitrile, polyvinyl pyrrolidone, polyisoprene, polyvinyl alcohol, cellulose derivatives such as methyl-cellulose or copolymers such as acrylonitrile-styrene copolymers, butadieneacrylonitrile copolymers which may be hydrogenated or acrylonitrile-(meth)acrylate copolymers. The solvents used are of the kind capable of dissolving the polymers mentioned above.

Polymers containing polar groups such as halogen atoms, nitrile groups, hydroxyl groups or carboxylic ester groups are preferred, e.g. polyvinyl chloride, polyvinyl alcohol, polyacrylonitrile, copolymers containing acrylonitrile and polyvinyl pyrrolidone.

The polymer products are composed of 0.1–99% by weight of polyacetylene and 99.9–1% by weight of 1 or more other polymers, preferably 1–50% by weight of polyacetylene and 99–50% by weight of 1 or more than 1 other polymer.

The catalysts used may be any nickel catalysts suitable for the preparation of polyacetylene, provided they are not inactivated by the polymer solution. It is preferred to use nickel compounds which can be prepared by the reaction of a nickel-(O) compound or a compound capable of being converted into a nickel-(O) compound in situ with compounds corresponding to the formulae (I) and (II)

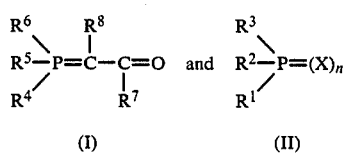

(I)        (II)

wherein
$R^1$, $R^2$ and $R^3$ denote, independently of one another, $C_1$–$C_{20}$ alkyl, $C_6$–$C_{12}$ aryl or $C_3$–$C_8$ cycloalkyl, any of which groups may be substituted by halogen, hydroxyl, $C_1$–$C_{20}$ alkoxy or $C_6$–$C_{12}$ aryloxy; or they may denote $C_6$–$C_{12}$-aryl-$C_{C1}$–$C_{20}$-alkyl, $C_1$–$C_{20}$-alkyl-$C_6$–$C_{12}$-aryl, $C_1$–$C_{20}$-alkyl-$C_3$–$C_8$-cycloalkyl, $C_6$–$C_{12}$-aryl-$C_3$–$C_8$-cycloalkyl, $C_2$–$C_6$-alkenyl, $C_6$–$C_{12}$-aryl-$C_2$–$C_6$-alkenyl or di-$C_1$–$C_4$-alkylamino or substituted or unsubstituted phenoxy or alkoxy, X denotes O, $NR^9$ or

n denotes 0 or 1,
$R^4$, $R^5$, $R^6$, $R^7$ and $R^8$ denote, independently of one another, $C_1$–$C_{20}$ alkyl, $C_6$–$C_{12}$ aryl, $C_2$–$C_{30}$ alkenyl or $C_3$–$C_8$-cycloalkyl, any which groups may be substituted by halogen, hydroxyl, $C_1$–$C_{20}$ alkoxy or $C_6$–$C_{12}$-aryloxy; or they may denote $C_6$–$C_{12}$-aryl-$C_1$–$C_{20}$-alkyl, $C_1$–$C_{20}$-alkyl-$C_6$–$C_{12}$-aryl, halogen, hydroxyl, $C_1$–$C_{20}$-alkoxy or $C_6$–$C_{12}$-aryloxy, or
$R^7$ may denote hydrogen and
$R^8$ may denote hydrogen or sulphonate and
$R^9$, $R^{10}$ and $R^{11}$ denote, independently of one another, hydrogen, silyl, nitrophenyl, halogen, cyano or $R^1$.

Furthermore, the nickel catalysts used may be nickel compounds which may be prepared by the reaction of a nickel-(O) compound or a compound capable of being converted into a nickel-(O) compound with an adduct or a mixture of maleic acid anhydride, a compound corresponding to formula II in which n=0 and a compound corresponding to formula II in which n=0 or 1, wherein $R^1$, $R^2$ and $R^3$ have the meanings mentioned above.

The groups $R^1$, $R^2$ and $R^3$ are preferably $C_1$–$C_6$ alkyl, cyclohexyl, phenyl, tolyl, benzyl, di-$C_1$–$C_4$-alkylamino, phenoxy and $C_1$–$C_4$ alkoxy.

$R^4$ is preferably $C_6$–$C_{12}$ aryl.

$R^5$, $R^6$, $R^7$ and $R^8$ are preferably cyclohexyl, phenyl, tolyl, benzyl, vinyl or $C_1$–$C_4$ alkyl.

Hydrogen and $C_1$–$C_4$ alkoxy are also preferred meanings for $R^7$ and hydrogen and sulphonate are also preferred for $R^8$.

$R^9$, $R^{10}$ and $R^{11}$ are preferably hydrogen, $C_1$–$C_6$ alkyl, phenyl, chlorophenyl, nitrophenyl, $C_1$–$C_6$ alkyl phenyl, trimethyl silyl, chloro, cyano, $C_2$–$C_6$-alkenyl or phenyl-$C_2$–$C_6$-alkenyl.

The nickel compounds are believed to correspond to the formula (III)

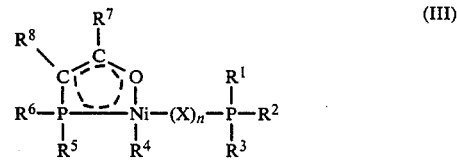

(III)

wherein X, n and $R^1$ to $R^8$ have the meanings indicated above or, in the case of a maleic acid anhydride adduct, X, n and $R^1$–$R^6$ have the meanings indicated above and $R^7$ and $R^8$ together form the group —O—CO—CH$_2$—.

The compounds of formula (I) and formula (II) are preferably used in a quantity of 1-4 mol of compound of formula (I) and 1-4 mol of compound of formula (II) per mol of nickel-(O) compound, most preferably 1 mol of compound of formula (I) and 1 mol of compound of formula (II) per mol of nickel-(O) compound.

The reaction temperature is 0° to 100° C., in particular 20° to 70° C.

The reaction is carried out with exclusion of oxygen, preferably in a solvent, which must be inert towards the reactants, e.g. a solvent such as benzene, toluene, cyclohexane or n-hexane.

After termination of the reaction, the catalyst may be isolated as a solid, usually by filtration, the solution having previously been concentrated by evaporation and/or cooled as required.

However, the catalyst may also be used directly for the polymerisation of acetylene without being first isolated.

Ni(cyclo octadiene)$_2$ and Ni(allyl)$_2$ are examples of nickel-(O) compounds.

The following are examples of nickel compounds capable of being converted into nickel-(O) compounds in situ: Ni-acetyl acetonate, Ni-octanoate and Ni-stearate, which may be reduced by means of the usual reducing agents such as boranate, alanate, aluminium alkyls or lithium organyls.

The quantity of nickel compound used is not critical. Typical catalyst concentrations lie in the range of $10-10^{-6}$ mol per liter, preferably $10^{-2}$ to $10^{-4}$ mol per liter. The quantity of catalyst used, based on the quantity of acetylene, is in the range of 0.1 t 10% by weight, preferably 0.5 to 5% by weight.

Polymerisation may be carried out either continuously or batch-wise.

The polymerisation temperature is preferably in the range of $-20°$ to 120° C., in particular 0° to 100° C. When low temperatures are employed, it is advisable to activate the catalyst by means of organic aluminium compounds such as alkoxy aluminium dialkyl or aluminium trialkyl.

Polymerisation may be carried out at normal pressure or under raised pressure. The acetylene may be used without further purification from the pressure flask. If the catalyst is sensitive to acetone, any acetone present in the acetylene should first be removed by freezing in a cooling trap.

Viewed macroscopically, the polyacetylene-containing polymer products according to the invention are found to have either a heterogeneous or a homogeneous distribution of polyacetylene in the polymer matrix. Heterogeneous distribution is recognised by the discrete black particles of polyacetylene present in the polymer matrix, albeit in a highly disperse distribution. Homogeneous distribution is recognised by a yellowish brown to deep blue colour extending right through the polymer product.

All polymer products containing polyacetylene may be processed in the usual manner into shaped products such as threads or films without losing their electrical properties.

The electrical properties undergo no change in the course of prolonged storage.

The polyacetylene may be doped in the usual manner, for example with iodine. The electric conductivity may be increased as desired by up to about 10 orders of magnitude by such doping, whereby the products become usable over a wide field of application ranging from non-conductors through semi-conductors to electric conductors. The degree of doping is determined formally from the increase in weight produced by the iodination.

PREPARATION OF CATALYST 5 mmol of bis-cyclo octadiene-nickel(O) in 100 ml of anhydrous toluene saturated with nitrogen are mixed with 5 mmol of benzoyl-methylene-triphenyl phosphorane and 5 mmol of methylene-trimethyl phosphorane under nitrogen. The reaction mixture is heated to 40°-60° C. with vigorous stirring for about 2 hours. The dark yellow-brown solution obtained is filtered. This solution or a part thereof is used in the subsequent acetylene polymerisation.

EXAMPLE 1

General method of synthesis 200 g of a 10% by weight of a polymer solution (degasified, saturated with nitrogen) were introduced into a 1 liter reaction flask (gas inlet, dropping funnel without pressure equalization with supply of nitrogen, stirrer, internal thermometer, reflux condenser with bubble counter) and heated to 60° C. 20 ml of DMSO were then injected. 0.5 mmol of the above described catalyst in 10 ml of toluene were added drop-wise under nitrogen pressure and a uniform stream of acetylene gas (dry ice/acetone) was introduced over a period of 2 hours. An aliquot portion of the solution was evaporated to dryness on a rotary evaporator, washed with ethanol and dehydrated in an oil pump vacuum. The increase in weight was due to polyacetylene (PAC) formed in the matrix polymer, and generally amounted to 10-20% by weight. To another aliquot portion of reaction solution there was added the quantity of iodine required to provide 1 mol of I$_2$ per mol of polymerised acetylene, and the mixture was stirred overnight. This again was evaporated to dryness on a rotary evaporator, the iodine excess was washed out with alcohol and the doped matrix-polyacetylene was dehydrated in an oil pump vacuum. The formal degree of doping was in the range of 0.1 to 0.3 iodine atoms per unit of the formula CH. The materials had electrical properties of the kind required, for example, for antistatic purposes.

| Polymer | $c_{PAC}$ (% by weight) | Degree of doping PAC | Conductivity ($\Omega^{-1} \cdot cm^{-1}$) | colour of undoped matrix -PAC solution |
|---|---|---|---|---|
| Polystyrene | — | — | $2 \times 10^{-14}$ | black, |
|  | 13 | 0.1 | $4 \times 10^{-6}$ | heterogeneous |
| Natural rubber | — | — | $1 \times 10^{-13}$ | black, |
|  | 9 | — | $1 \times 10^{-7}$ | heterogeneous |
| Polychloroprene | — | — | $4 \times 10^{-9}$ | brown |
|  | 10 | 0.3 | $2 \times 10^{-7}$ |  |
| Polyvinylchloride | — | — | $1 \times 10^{-13}$ | reddish brown, |
|  | 16 | 0.1 | $2 \times 10^{-7}$ | homogeneous |
| Polycarbonate | — | — | $1 \times 10^{-13}$ | brown, |
|  | 18 | 0.1 | $1 \times 10^{-7*}$ | homogeneous |
| Polyethylacrylate | — | — | $1 \times 10^{-11}$ | black, |
|  | 18 | — | $1 \times 10^{-6}$ | heterogeneous |
| Polymethylmethacrylate | — | — | $1 \times 10^{-13}$ | black, |
|  | 20 | — | $2 \times 10^{-6*}$ | heterogeneous |

*unchanged after 6 months storage.

EXAMPLE 2

0.25 mmol of the catalyst according to Example 1 in 5 ml of DMF was injected at 60° C., with stirring, into 50 ml of a 10% by weight polyacrylonitrile (PAN) solution in DMF which had been degasified and saturated with nitrogen. Acetylene which had passed through a coil cooled with dry ice/acetone was introduced for 1 hour.

The homogeneous reaction solution was brown in colour. After removal of the solvent, a polymer which contained 18 mol percent of PAC according to IR investigation was obtained.

EXAMPLE 3

The procedure was the same as in Example 2 but the quantity of catalyst was increased to 0.5 mmol. The homogeneous reaction solution obtained was deep blue. The UV spectrum showed an absorption maximum at 17.4 kk. The polymer contained 47 mol percent of PAC.

Instead of isolating by removal of solvent, the PAC-PAN polymer could be obtained by precipitation with toluene followed by washing with toluene/hexane and drying under vacuum. The matrix-polyacetylene thus obtained was again soluble in DMF, DMSO and other highly polar solvents.

I claim:

1. A process for the preparation of a polymer product comprising polyacetylene composed of 0.1 to 99% by weight of polyacetylene and 99.9 to 1% by weight of other polymers, said polyacetylene being in a highly disperse, heterogeneous distribution or in a homogeneous distribution, the process comprising polymerizing acetylene in the presence of a solution of a polymer other than polyacetylene and in the presence of an amount effective for polymerization of acetylene of nickel compounds which constitute catalysts for the preparation of polyacetylene and are not inactivated by the polymer solution, said nickel compounds being prepared by a first method comprising the reaction of a nickel-(O) compound or of a compound capable of being converted in situ into a nickel-(O) compound with compounds corresponding to formulae (I) and (II),

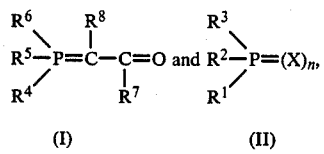

(I)　　　　　　　(II)

wherein $R^1$, $R^2$ and $R^3$ denote, independently of one another, $C_1$–$C_{20}$ alkyl, $C_6$–$C_{12}$ aryl or $C_3$–$C_8$ cyclo alkyl, any of which groups may be substituted by halogen, hydroxyl, $C_1$–$C_{20}$ alkoxy or $C_6$–$C_{12}$ aryloxy; or $R^1$, $R^2$ and $R^3$ denote $C_6$–$C_{12}$-aryl-$C_1$–$C_{20}$-alkyl, $C_1$–$C_{20}$-alkyl-$C_6$–$C_{12}$-aryl, $C_1$–$C_{20}$-alkyl-$C_3$–$C_8$-cycloalkyl, $C_6$–$C_{12}$-aryl-$C_3$–$C_8$ cycloalkyl, $C_2$–$C_6$-alkenyl, $C_6$–$C_{12}$-aryl-$C_2$–$C_6$-alkenyl, di-$C_1$–$C_4$-alkylamino, phenoxy or alkoxy, X denotes O, $NR^9$ or

n denotes zero or one, $R^4$, $R^5$, $R^6$, $R^7$ and $R^8$ denote, independently of one another, $C_1$–$C_{20}$-alkyl, $C_6$–$C_{12}$-aryl, $C_2$–$C_{30}$-alkenyl or $C_3$–$C_8$ cycloalkyl, any of which groups may be substituted by halogen, hydroxy, $C_1$–$C_{20}$ alkoxy or $C_6$–$C_{12}$-aryloxy; or $R^4$, $R^5$, $R^6$, $R^7$ and $R^8$ denote $C_6$–$C_{12}$-aryl-$C_1$–$C_{20}$-alkyl, $C_1$–$C_{20}$-alkyl-$C_6$–$C_{12}$-aryl, halogen, hydroxyl, $C_1$–$C_{20}$ alkoxy or $C_6$–$C_{12}$-aryloxy, and furthermore, in the case of $R^7$, hydrogen, and in the case of $R^8$, hydrogen or sulphonate;

$R^9$, $R^{10}$ and $R^{11}$ denote, independently of one another, hydrogen, nitrophenyl, silyl, halogen, cyano or $R^1$; or said nickel compounds are prepared by a second method comprising the reaction of a nickel-(O) compound or a compound capable of being converted in situ into a nickel-(O) compound with an adduct or a mixture of maleic acid anhydride, and a first compound corresponding to formula II in which n=0 and a compound corresponding to formula (II) in which n=0 or 1.

2. Process according to claim 1, wherein $R^1$, $R^2$ and $R^3$ denote $C_1$–$C_6$ alkyl, cyclohexyl, phenyl, tolyl, benzyl, di-$C_1$–$C_4$-alkylamino, phenoxy and $C_1$–$C_4$ alkoxy, $R^4$ denotes $C_6$–$C_{12}$ aryl, $R^5$, $R^6$, $R^7$ and $R^8$ denote cyclohexyl, phenyl, tolyl, benzyl, vinyl and $C_1$–$C_4$ alkyl, and in the case of $R^7$, hydrogen or $C_1$–$C_4$ alkoxy, and in the case of $R^8$, hydrogen or sulphonate;

$R^9$, $R^{10}$ and $R^{11}$ denote hydrogen, $C_1$–$C_6$ alkyl, phenyl, chlorophenyl, nitrophenyl, $C_1$–$C_6$ alkylphenyl, trimethylsilyl, chloro, cyano, $C_2$–$C_6$ alkenyl or phenyl-$C_2$–$C_6$-alkenyl.

3. Process according to claim 1, characterised in that polymerisation is carried out at a temperature from −20° to 120° C.

4. Process according to claim 1, characterised in that said other polymers have polar groups.

5. A process according to claim 1, wherein the polymerization is conducted at a temperature of 0° to 100° C.

* * * * *